United States Patent
Gallant et al.

(10) Patent No.: US 9,840,321 B2
(45) Date of Patent: Dec. 12, 2017

(54) AIRCRAFT NOSE PROVIDED WITH A CONNECTING FRAME BETWEEN THE LANDING GEAR HOUSING AND THE OUTER SKIN OF THE FUSELAGE

(71) Applicant: Airbus Operations (SAS), Toulouse (FR)

(72) Inventors: Guillaume Gallant, Lareole (FR); Herve Biennes, Grenade (FR)

(73) Assignee: Airbus Operations SAS, Toulouse (FR)

(*) Notice: Subject to any disclaimer, the term of this patent is extended or adjusted under 35 U.S.C. 154(b) by 186 days.

(21) Appl. No.: 14/966,478

(22) Filed: Dec. 11, 2015

(65) Prior Publication Data

US 2016/0176513 A1   Jun. 23, 2016

(30) Foreign Application Priority Data

Dec. 18, 2014   (FR) .................................... 14 62796

(51) Int. Cl.
| | |
|---|---|
| B64C 25/16 | (2006.01) |
| B64C 1/06 | (2006.01) |
| B64F 5/00 | (2017.01) |
| B64C 1/10 | (2006.01) |
| B64C 25/10 | (2006.01) |
| B64C 25/14 | (2006.01) |

(52) U.S. Cl.
CPC .............. *B64C 25/16* (2013.01); *B64C 1/068* (2013.01); *B64C 1/10* (2013.01); *B64C 25/10* (2013.01); *B64C 25/14* (2013.01); *B64F 5/00* (2013.01)

(58) Field of Classification Search
CPC  B64C 1/068; B64C 1/10; B64C 25/10; B64C 25/14; B64C 25/16; B64F 5/00
See application file for complete search history.

(56) References Cited

U.S. PATENT DOCUMENTS

| | | | | |
|---|---|---|---|---|
| 2,661,171 A | * | 12/1953 | Allen ..................... | B64C 25/26 244/102 SL |
| 3,198,461 A | * | 8/1965 | Beach ..................... | B64C 25/20 244/102 R |
| 5,482,228 A | * | 1/1996 | Hoshino ................. | B64C 25/50 244/102 A |
| 6,047,925 A | * | 4/2000 | Rivera ................... | H01Q 13/18 244/129.4 |

(Continued)

FOREIGN PATENT DOCUMENTS

FR   2910875   7/2008

OTHER PUBLICATIONS

French Search Report, dated Oct. 2, 2015.

*Primary Examiner* — Justin M Benedik
(74) *Attorney, Agent, or Firm* — Greer, Burns & Crain Ltd.

(57) ABSTRACT

In order to assist fitting of doors to the landing gear housing and adjusting their position, an aircraft nose is provided comprising a connecting frame between the landing gear housing and the outer skin of the fuselage, the connecting frame extending around an opening in the outer skin and comprising a skirt bearing against the outer skin of the fuselage and attached thereto, the skirt defining a passage for landing gear which is configured to be closed off by doors when the landing gear are in a closed position, and supporting members extending between the fuselage and the doors.

14 Claims, 5 Drawing Sheets

(56) References Cited

U.S. PATENT DOCUMENTS

| | | | | |
|---|---|---|---|---|
| 6,213,428 B1* | 4/2001 | Chaumel | ............... | B64C 1/068 |
| | | | | 244/102 R |
| 7,784,736 B2 | 8/2010 | Guering et al. | | |
| 8,840,066 B2* | 9/2014 | Loupias | ............... | B64C 1/068 |
| | | | | 244/102 R |
| 9,096,311 B2* | 8/2015 | Gleyze | ............... | B64C 25/16 |
| 9,376,200 B2* | 6/2016 | Durand | ............... | B64C 13/04 |
| 2008/0210813 A1 | 9/2008 | Guering et al. | | |
| 2008/0251637 A1* | 10/2008 | Reynes | ............... | B64C 25/24 |
| | | | | 244/100 R |
| 2013/0134259 A1* | 5/2013 | Lieven | ............... | B64C 25/20 |
| | | | | 244/102 A |
| 2013/0146710 A1* | 6/2013 | Bernadet | ............... | B64D 45/00 |
| | | | | 244/119 |

\* cited by examiner

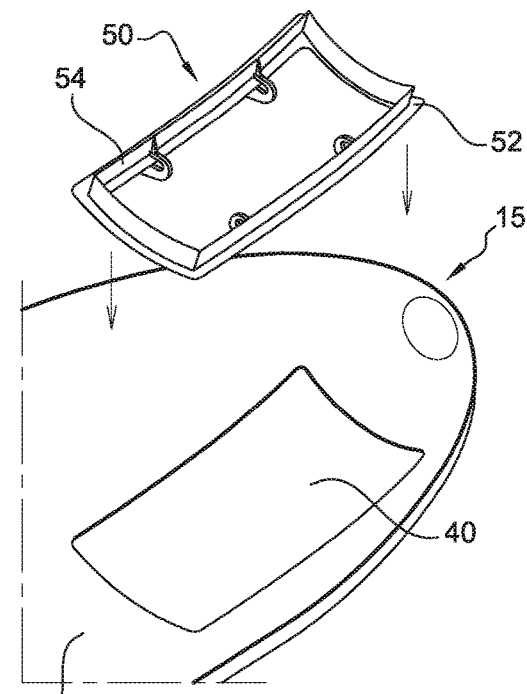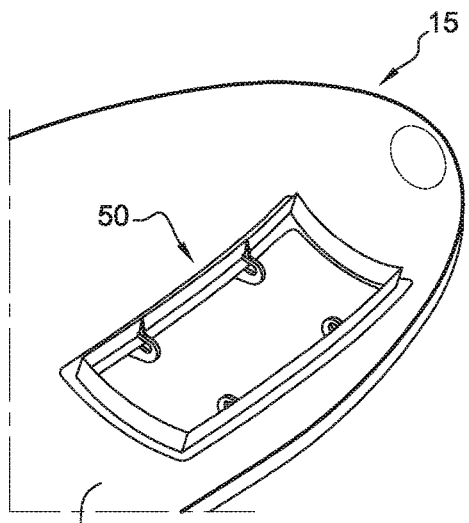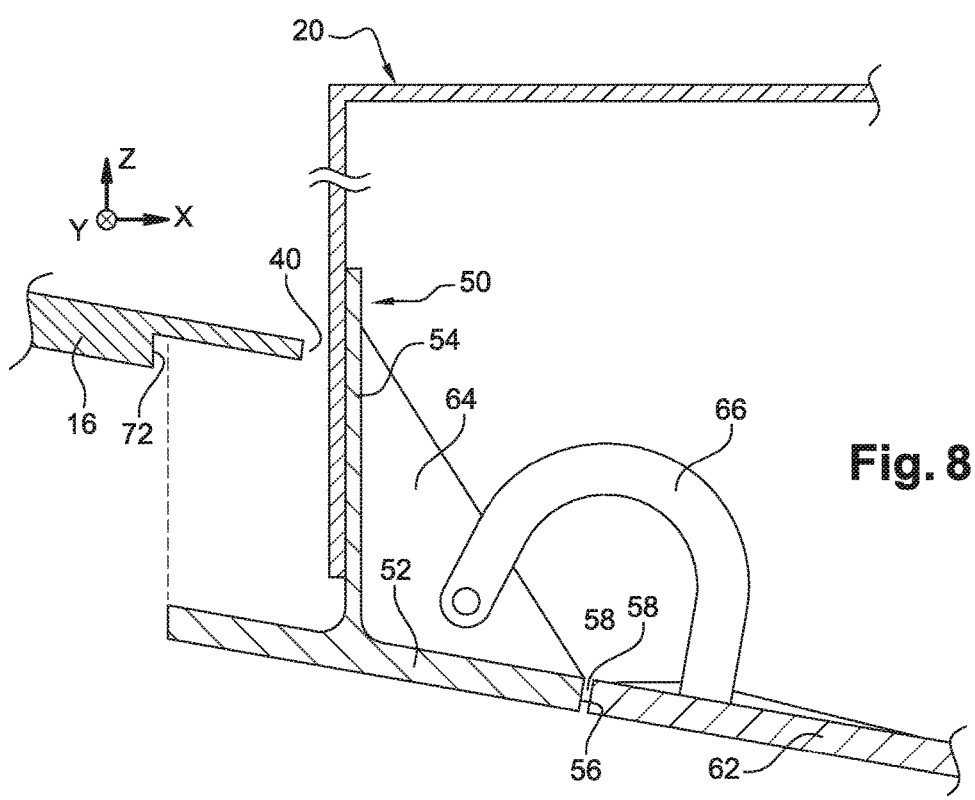

AIRCRAFT NOSE PROVIDED WITH A CONNECTING FRAME BETWEEN THE LANDING GEAR HOUSING AND THE OUTER SKIN OF THE FUSELAGE

CROSS-REFERENCES TO RELATED APPLICATIONS

This application claims the benefit of the French patent application No. 1462796 filed on Dec. 18, 2014, the entire disclosures of which are incorporated herein by way of reference.

BACKGROUND OF THE INVENTION

This invention relates to the front part of an aircraft, also known as the nose, comprising a landing gear housing which houses front landing gear.

The invention applies to all types of aircraft.

The nose of aircraft has been the subject of many developments with a view to optimizing its mass, volume, cost, safety, ease of manufacture, maintenance, etc. Such a nose is for example known from documents FR 2 910 875 and U.S. Pat. No. 7,784,736.

Despite the fact that many designs are in existence the environment of the nose landing gear housing can still be optimized, in particular to assist fitting of the landing gear doors when assembling the nose or during maintenance.

Normally the landing gear housing is defined by three or five stiffened panels. Plates for hinging the doors are attached to the side walls of this landing gear housing, which is itself attached to the fuselage in a well for passage of the landing gear made in the outer skin of the fuselage. After the housing has been mounted on the fuselage an operation of adjusting the positioning of the doors with respect to the well made in the outer skin is carried out so as to reduce the play between that skin and the edges of the doors by as much as possible.

In addition to requiring specific equipment for adjusting the position of the doors, such as wedges associated with the hinge plates for these doors, the centering operation is expensive in terms of cost and time. Sometimes it even requires adjustments to the perimeters of the doors and/or the opening in the outer skin of the fuselage.

There is therefore a need to optimize the design of the environment of the front landing gear housing with a view in particular to assisting adjustment of the doors closing the landing gear housing.

SUMMARY OF THE INVENTION

In order to meet this need, the invention first relates to an aircraft nose comprising a fuselage, a landing gear housing, front landing gear housed in the landing gear housing and at least one door closing the landing gear housing, the fuselage comprising an outer skin provided with an opening for passage of the landing gear. In accordance with the invention, the nose further comprises a connecting frame between the landing gear housing and the outer skin of the fuselage, the connecting frame extending around the opening in the outer skin of the fuselage and comprising:

a skirt bearing against the outer skin of the fuselage and attached thereto, the skirt defining a passage for the landing gear which is configured so that it can be closed off by the at least one door when the latter occupies a closed position, and means for supporting the at least one door.

The invention is advantageous in that assembly of the door/doors is easier in comparison with the solutions in the prior art. In fact these doors are directly mounted on the connecting frame, as a result of which it is possible to benefit from accurate positioning in relation to the passage for the landing gear defined by that same connecting frame, which thus extends around the edges of the opening in the outer skin. In other words this precise positioning is achieved through construction, without being subject to the accuracy with which the constituent components of the nose of the aircraft have been assembled.

In addition to this, the connecting frame is provided with a skirt configured to bear against the outer skin of the fuselage around the perimeter of the opening made in that skin. Advantageously this assembly only requires little accuracy, and has no effect on the centering of the doors in the through passage of the connecting frame.

The invention thus offers gains in terms of assembly times and costs and adjustment of the doors of the landing gear housing. These gains arise not only when the nose is being assembled, but also during maintenance operations with a view to dismantling/replacing the doors.

The invention has at least one of the following optional characteristics taken in isolation or in combination.

The frame also comprises a web member, and the supporting means are mounted on the skirt and/or the web member.

The landing gear housing is attached to the web member of the connecting frame.

In transverse cross-section the frame has the overall shape of an upside-down T.

At least one of the two elements of the skirt of the connecting frame and the outer skin of the fuselage is provided with a double fold or rebate in order to receive the other of the two elements.

The outer skin of the fuselage covers the skirt of the connecting frame on the outside, or vice versa.

The connecting frame is also provided with bearings for hinging a landing gear leg and/or landing gear strut breaker.

The connecting frame is made of a single piece, or using a plurality of parts bolted or welded together.

The landing gear housing is made of five stiffened panels assembled together. Alternatively it may have only three stiffened panels.

The invention also relates to an aircraft comprising a nose as described above.

The invention also relates to a process for assembling such a nose comprising stages comprising:

a) attaching the connecting frame to the outer skin of the fuselage;

b) attaching the connecting frame to the landing gear housing;

stages a) and b) being performed in any order.

According to a first preferred embodiment of the invention the outer skin of the fuselage covers the skirt of the connecting frame on the outside and stage a) comprises fitting the connecting frame from inside the fuselage. Furthermore it should be noted that stage a) may be carried out before or after stage b).

According to a second preferred embodiment of the invention the skirt of the connecting frame covers the outer skin of the fuselage on the outside and stage a) comprises fitting the connecting frame from outside the fuselage. Preferably stage b) is then carried out before stage a). In this way it comprises a single module comprising the connecting frame and the landing gear housing which can be handled from outside the fuselage when carrying out stage a).

Whichever embodiment of the two described above is envisaged the doors can be mounted on the connecting frame before or after operations a) and b), or even between these two operations.

Other advantages and characteristics of the invention will be apparent from the non-limiting detailed description below.

BRIEF DESCRIPTION OF THE DRAWINGS

This description will be provided in relation to the appended drawings in which:

FIGS. 7a and 7b provide diagrams of different stages in a process for assembling the nose illustrated in the previous figures; and FIG. 8 provides a diagram of a stage in a process for assembling a nose according to a second preferred embodiment of the invention.

DETAILED DESCRIPTION OF THE PREFERRED EMBODIMENTS

Figure 1:
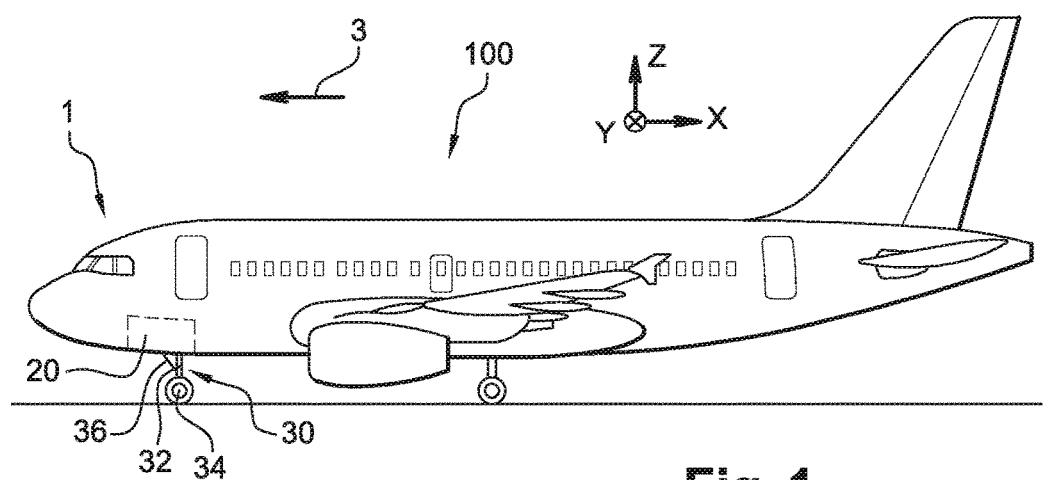
FIG. 1 shows a side view of an aircraft having a nose according to the invention.

With reference to FIG. 1, this shows an aircraft 100 of the commercial aircraft type comprising a nose 1 according to the invention.

Throughout the following description, by convention X corresponds to the longitudinal direction of the aircraft, Y to the horizontal direction orientated transversely with respect to the latter and Z to the vertical direction or elevation, these three directions X, Y and Z being at right-angles to each other.

In addition to this the terms "front" and "rear" are to be considered with regard to the direction of movement of the aircraft occurring as a result of the thrust exerted by the turbojets, this direction being shown diagrammatically by arrow 3.

Figure 2:
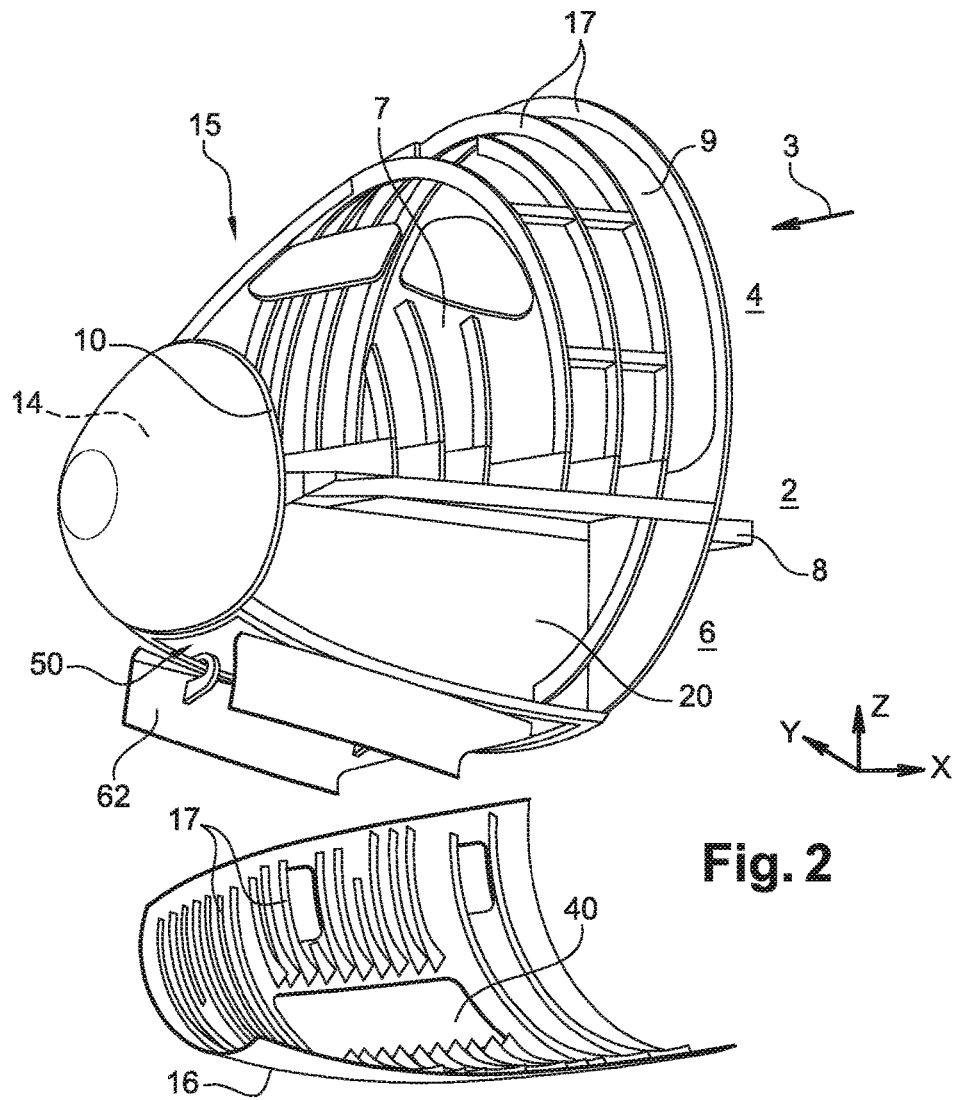
FIG. 2 represents a partly exploded perspective view of the nose of an aircraft in accordance with the first preferred embodiment.

With reference to FIGS. 1 and 2, nose 1 first comprises in its aftermost part a pressurized zone 2 within which there is a separation floor 8 between an upper pressurized compartment 4 which is generally used for the transport of people and a pressurized compartment below floor 6 which is normally used to locate technical equipment relating to the aircraft and/or storage of the payload. More precisely, from front to rear, upper pressurized compartment 4 generally comprises cockpit 7 of the aircraft followed by passenger cabin 9. On the other hand the pressurized compartment below floor 6 generally comprises, from front to rear, a zone known as the technical hold intended for storage of technical equipment specific to the aircraft, followed by a zone known as the cargo hold used for storage of the payload.

Pressurized zone 2 is bounded forward by a wall 10 which also defines to the front of it an unpressurised radome zone 14 used to house a radar unit. Behind radome wall 10 the nose is radially bounded by a fuselage 15, comprising an outer skin 16 supported on fuselage frames 17.

In front of the pressurized compartment below floor 6 there is a front landing gear housing 20, the interior of which is preferably not pressurized. Landing gear housing 20 houses front landing gear 30, which is shown in the lowered position in FIG. 1. Front landing gear 30 is of the conventional type and is known to those skilled in the art. Overall it comprises a landing leg 32 which is mounted so that it is hinged at one of its extremities and bears a wheel assembly 34 at its other extremity. It also comprises one or more deployment pistons (not shown), as well as a strut breaker 36 which generally comprises two segments hinged together, the lower extremity of which is hinge mounted on leg 32.

With reference to FIGS. 2 to 6, the environment of landing gear housing 20, which is specific to the invention, will now be described. First of all it should be noted that this front landing gear housing 20 is of generally solid rectangular shape formed of five stiffened panels assembled together. The sixth side of housing 20 is open at the bottom for the passage of landing gear 30. This open side corresponds to an opening 40 made in the skin 16 of fuselage 15, again to allow the passage of front landing gear 30.

One of the special features of the invention lies in the use of a connecting frame 50 providing a mechanical interface between front landing gear housing 20 and skin 16. More specifically connecting frame 50 has a generally rectangular shape following the perimeter of opening 40 in the skin, thus ensuring that it fills it.

In transverse cross-section connecting frame 50 has the general shape of an upside-down T, with a skirt 52 facing downwards in relation to web member 54, parallel to the Z direction. The angle between the web member and the skirt is not necessarily a right angle, it may in fact be curved and inclined in such a way as to locally match the skin 16 of fuselage 15 at the perimeter of its opening 40. In fact skirt 52 is placed on skin 16 in the Z direction, there preferably being direct contact between the two elements which are attached together by means of rivets, bolts or the like.

Connecting frame 50 therefore comprises four sections which are joined end to end to obtain its overall rectangular shape. These sections are made of a single piece from a machined or molded element, or these four sections are welded together. Frame 50 is preferably made of metal.

Skirt 52 of frame 50 has an inner edge 56 which internally defines a through passage 58 for the landing gear, this through passage also having a cross-section of overall rectangular shape. Through passage 58 is intended to be closed off by doors 62, for example three doors, including two side doors and a rear door.

Connecting frame 50 comprises supporting members which are used to hinge these doors 62. Here these are ribs 64 which are pierced for the passage of a hinge axis. Alternatively they may be in the form of plates.

Each rib 64 is preferably borne by web member 54 and skirt 52. The rib 64 is made of one piece with the rest of frame 50, or applied to the web member and skirt by welding. Each door 62 is fitted with several mechanical connecting members in the shape of a swan neck, reference 66, each hinged on a rib 64.

In the closed position doors 62 close off through passage 58 in such a way as to provide a satisfactory aerodynamic junction, in particular by limiting the play between the outer edge of doors 62 and the inner edge 56 of skirt 52. Being directly mounted on the connecting frame, doors 62 are thus very precisely positioned within through passage 58 as a result of their construction.

The lower end of landing gear housing 20 is attached to web member 54 of frame 50, again by rivets, bolts or the like. This attachment is made along the entire length of the frame, in the areas of overlap between the stiffened panels of housing 20 and web member 54. Also, as mentioned above, skirt 52 of joining frame 50 is attached to skin 16, the latter covering the skirt on the outside. As a consequence this assembly only requires little accuracy, and has no effect on the positioning of the doors, which remain perfectly centered in through passage 58 of connecting frame 50.

Fitting of doors 62 and adjustment of their position is made easier, both during the assembly of nose 1 and during maintenance work with a view to dismantling/replacing the doors.

In order to improve aerodynamic performance, skirt 52 is provided with a rebate 72 which receives outer skin 16. This rebate may be replaced by a double fold when it is desired that the skirt should have a constant thickness of material. It offers continuity between the outer surface of skin 16 and the outer surface of the other part of skirt 52, which also ensures aerodynamic continuity with the outer surface of doors 62 when in the closed position. A similar double fold or rebate may then be provided at the aerodynamic junction between the edges of doors 62 and the perimeter of opening 40 in skin 16.

Figure 3:
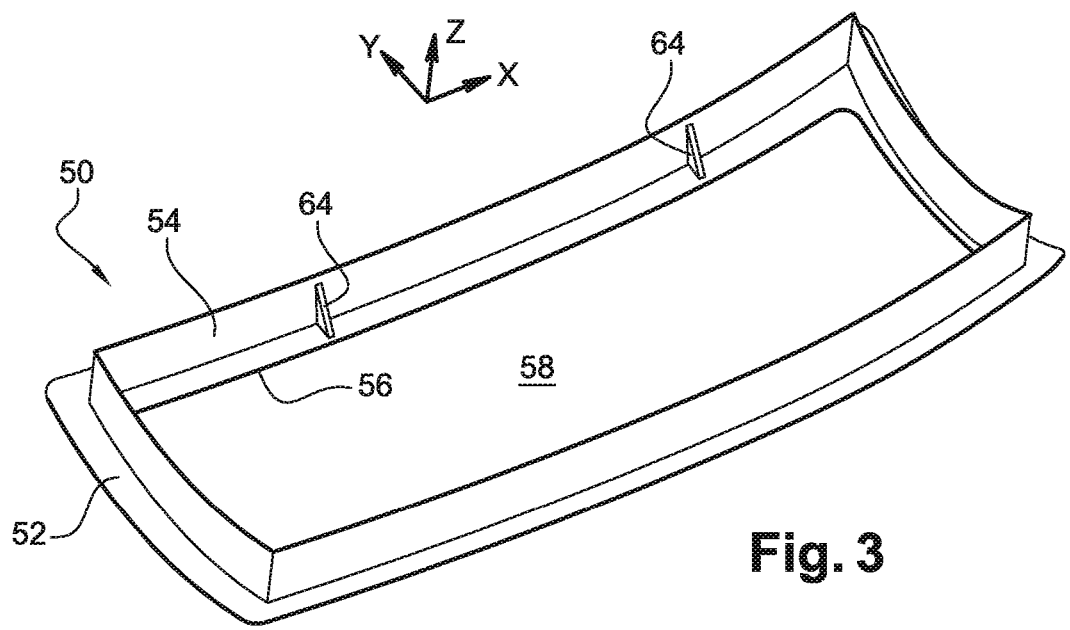
FIG. 3 is a perspective view of a connecting frame between the outer skin of the fuselage and the landing gear housing.
Figure 3A:
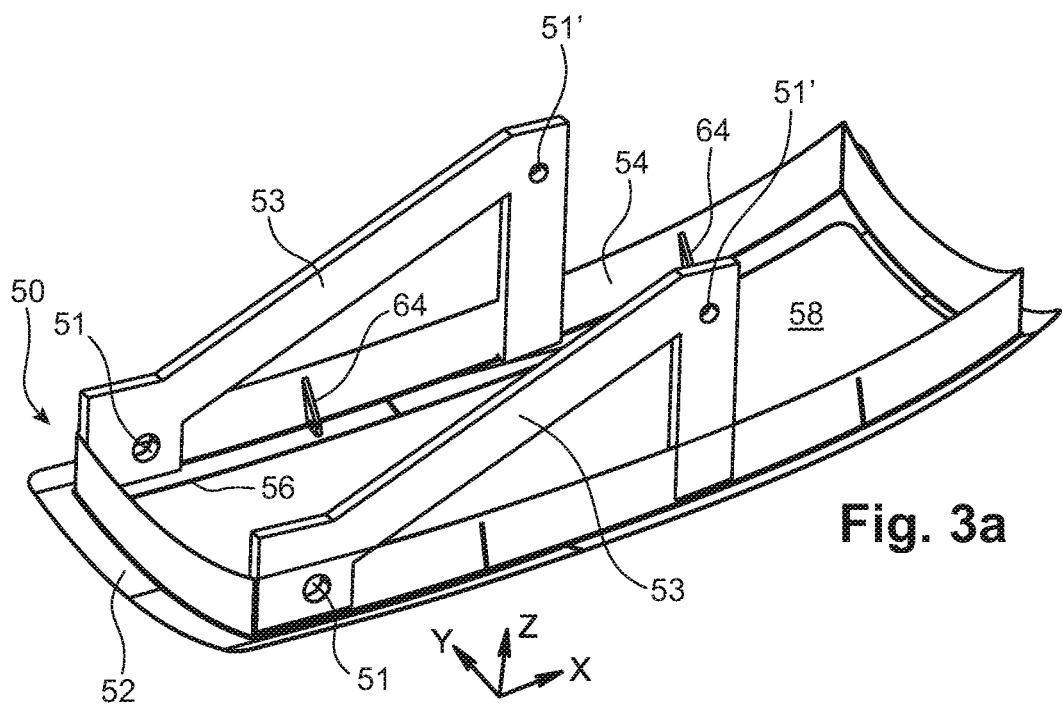
FIGS. 3a and 3b are views similar to that in FIG. 3, in which the connecting frame is in the form of other embodiments.
Figure 3B:
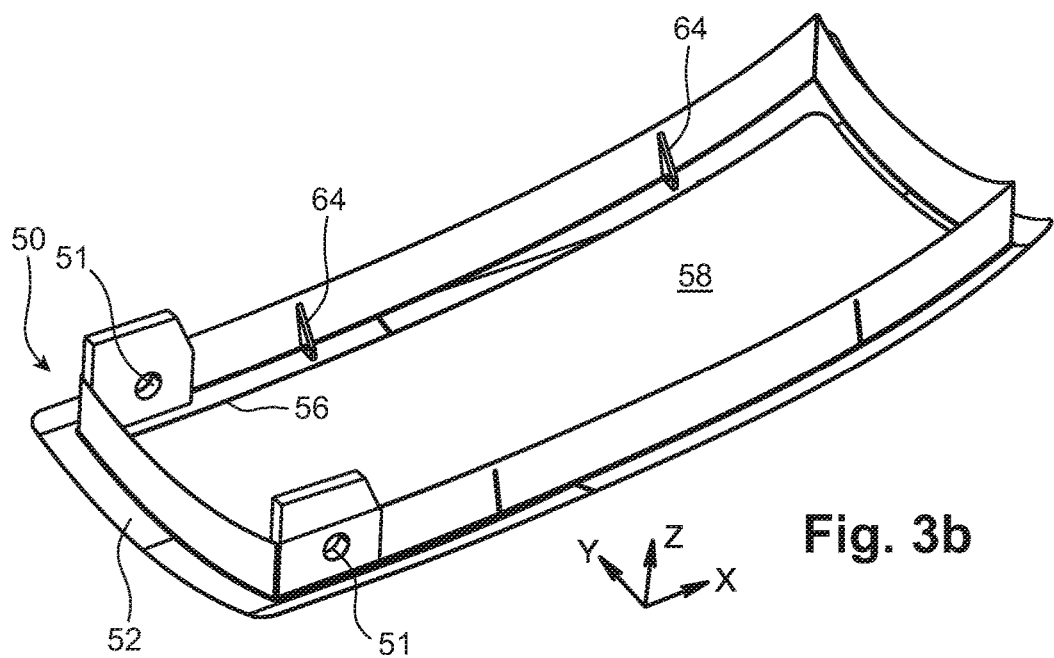
Figure 4:
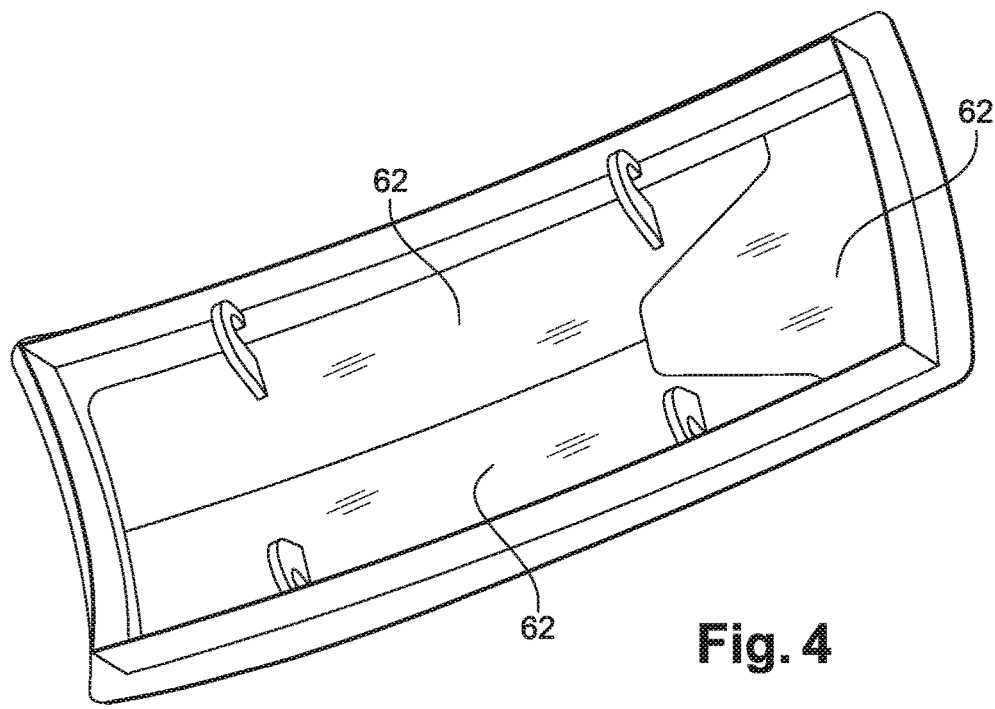
FIG. 4 is a view similar to that in FIG. 3, with the frame supporting the landing gear doors.
Figure 5:
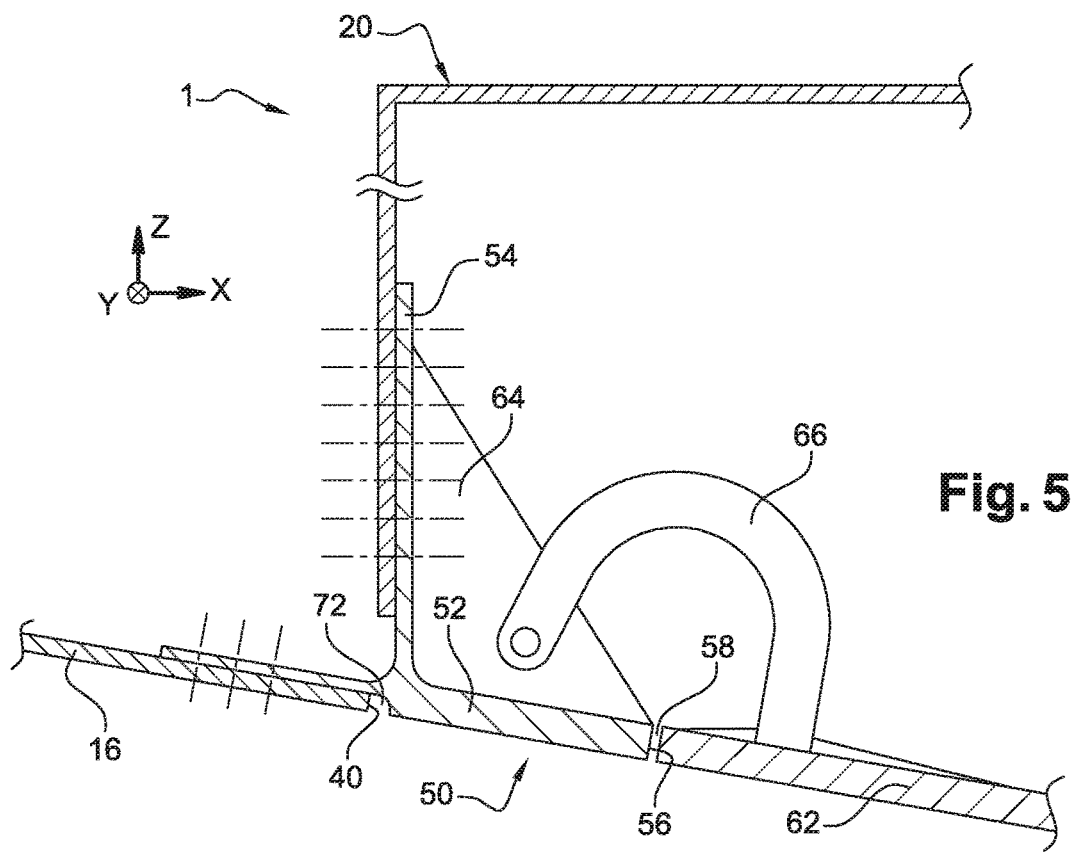
FIG. 5 is a view in transverse cross-section of the environment of the landing gear, with one of the doors shown in the closed position.
Figure 6:
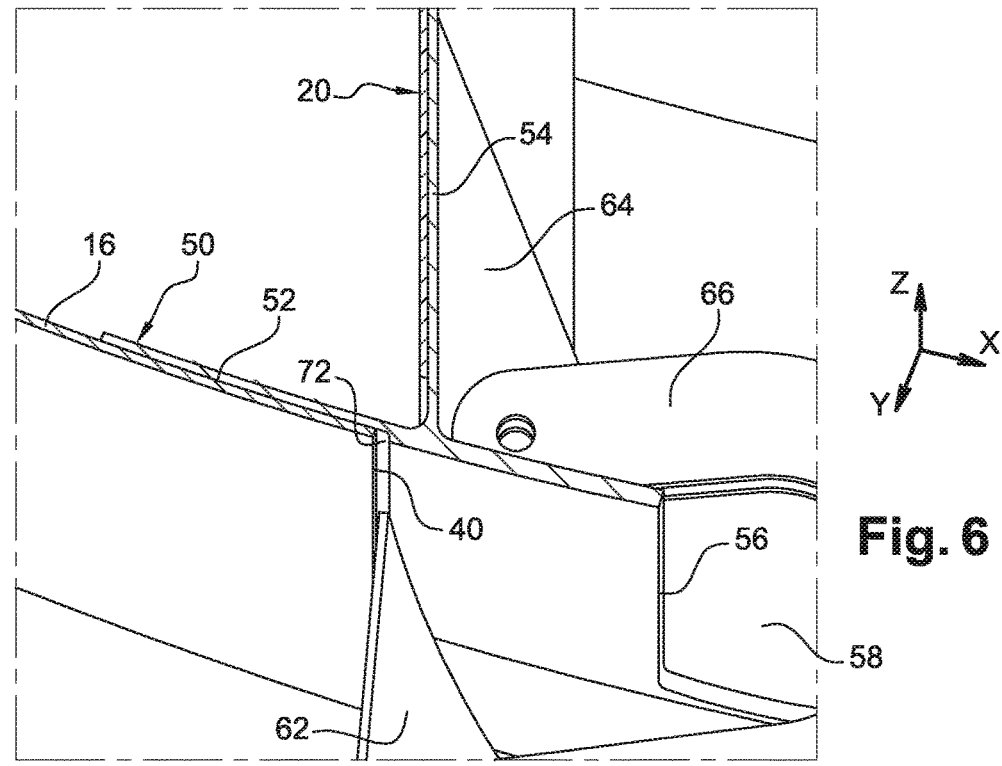
FIG. 6 is a perspective view of the environment of the landing gear, with one of the doors shown in the open position.

Finally, it is indicated that for ease of assembly, connecting frame 50 may also be fitted with bearings 51, 51' hinging the landing leg and/or strut breaker, as shown in FIGS. 3*a* and 3*b*. In order to do this, bearings 51 are attached to web member 54 and a strut 53 connects them to bearings 51' when the latter are provided on connecting frame 50, as is the case in the example in FIG. 3*b*.

FIGS. 7*a* and 7*b* show several stages in a process for assembling the nose 1 of an aircraft. First of all connecting frame 50 is placed in position on the outer skin of fuselage 16, from inside fuselage 15. This is brought about when skirt 52 bears against the perimeter of opening 40 in skin 16. Rebate 72 may help center frame 50 in opening 40. Subsequently superimposed elements 16, 52 are assembled by riveting or by means of a similar technique.

The process is continued by attaching the landing gear housing to web member 54 of the frame, again by riveting or by a similar technique.

In a second preferred embodiment of the invention shown diagrammatically in FIG. 8, it is skirt 52 which covers skin 16, and not the other way round as in the first embodiment. Because of this the stage of fitting and attaching frame 50 to skin 16 is carried out from outside the fuselage. Furthermore landing gear housing 20 can first be attached to frame 50 in order to obtain a module which is then moved as a unit from the outside of fuselage 1 towards opening 40. This module is secured when skirt 52 comes into contact with the perimeter of opening 40 in skin 16, which is here provided with a rebate 72.

Of course various modifications may be made by those skilled in the art to the invention which has just been described purely by way of non-limiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft nose comprising:
a fuselage,
a landing gear housing,
front landing gear housed in the landing gear housing,
at least one door closing off the landing gear housing,
the fuselage comprising an outer skin provided with an opening for passage of the landing gear, and
a connecting frame between the landing gear housing and the outer skin of the fuselage, the connecting frame extending around the said opening in the outer skin and comprising:
a skirt bearing against the outer skin of the fuselage and attached thereto, the skirt defining a passage for the landing gear which is configured so as to be closed off by the said at least one door when the at least one door is in the closed position; and
supporting members extending between the fuselage and said at least one door.

2. The nose according to claim 1, wherein the frame also comprises a web member, and wherein said supporting members are mounted on at least one of the skirt or the web member.

3. The nose according to claim 2, wherein the landing gear housing is attached to the web member of the connecting frame.

4. The nose according to claim 2, wherein the frame has the overall shape of an upside-down T in cross-section.

5. The nose according to claim 1, wherein at least one of the two elements comprising the skirt of the connecting frame and the outer skin of the fuselage is provided with a double fold or a rebate to receive the other of the two elements.

6. The nose according to claim 1, wherein the outer skin of the fuselage covers the skirt of the connecting frame on the outside, or vice versa.

7. The nose according to claim 1, wherein the connecting frame is also equipped with hinge bearings for at least one of a landing leg or a strut breaker of the landing gear.

8. The nose according to claim 1, wherein the connecting frame is made of a single piece, or from a plurality of pieces welded together.

9. The nose according to claim 1, wherein the landing gear housing is made from five stiffened panels assembled together.

10. An aircraft comprising
a nose comprising:
a fuselage,
a landing gear housing,
front landing gear housed in the landing gear housing,
at least one door closing off the landing gear housing,
the fuselage comprising an outer skin provided with an opening for passage of the landing gear, and a connecting frame between the landing gear housing and the outer skin of the fuselage, the connecting frame extending around the said opening in the outer skin and comprising:
  a skirt bearing against the outer skin of the fuselage and attached thereto, the skirt defining a passage for the landing gear which is configured so as to be closed off by the said at least one door when the latter is in the closed position; and
supporting members extending between said fuselage and said at least one door.

11. A process for assembling a nose comprising:
a fuselage,
a landing gear housing,
front landing gear housed in the landing gear housing,
  at least one door closing off the landing gear housing, the fuselage comprising an outer skin provided with an opening for passage of the landing gear, and
a connecting frame between the landing gear housing and the outer skin of the fuselage, the connecting frame extending around the said opening in the outer skin and comprising:
  a skirt bearing against the outer skin of the fuselage and attached thereto, the skirt defining a passage for the landing gear which is configured so as to be closed off by the said at least one door when the latter is in the closed position; and
supporting members extending between said fuselage and said at least one door, the process comprising the steps:
a) attaching the connecting frame to the outer skin of the fuselage;
b) attaching the connecting frame to the landing gear housing;
stages a) and b) being carried out in any order.

12. The process according to claim 11, wherein the outer skin of the fuselage covers the skirt of the connecting frame on the outside and in that stage a) comprises fitting the connecting frame from inside the fuselage.

13. The process according to claim 11, wherein the skirt of the connecting frame covers the outer skin of the fuselage on the outside and wherein stage a) comprises fitting the connecting frame from outside the fuselage.

14. The process according to claim 13, wherein stage b) is carried out before stage a).

\* \* \* \* \*